D. HAYS.
Corn-Planter and Plow.
No. 204,218. Patented May 28, 1878.
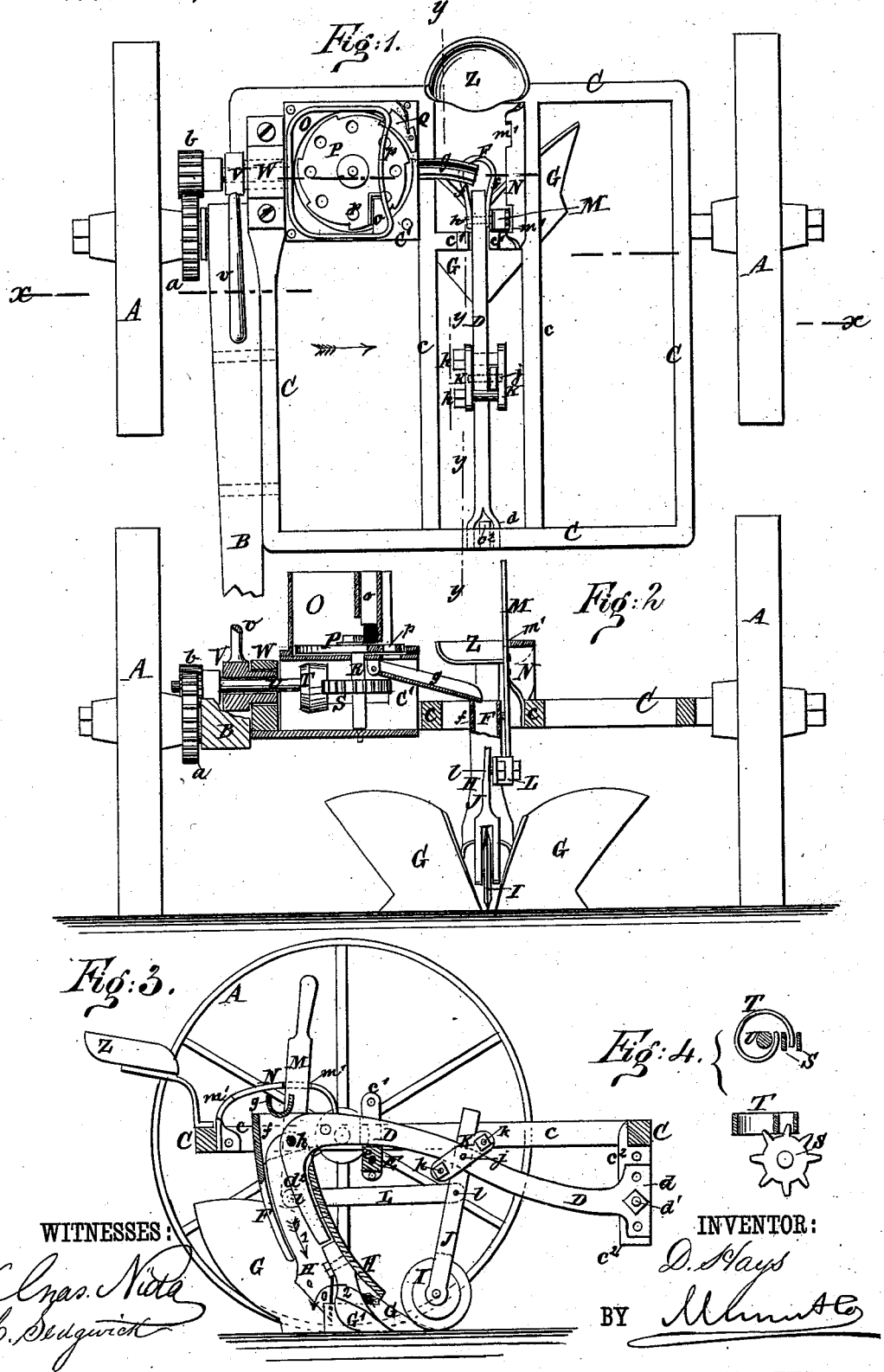
WITNESSES:
INVENTOR: D. Hays
BY
ATTORNEYS.

UNITED STATES PATENT OFFICE.

DANIEL HAYS, OF MARTINSVILLE, MISSOURI.

IMPROVEMENT IN CORN-PLANTER AND PLOW.

Specification forming part of Letters Patent No. 204,218, dated May 28, 1878; application filed February 11, 1878.

*To all whom it may concern:*

Be it known that I, DANIEL HAYS, of Martinsville, in the county of Harrison and State of Missouri, have invented a new and Improved Corn-Planter and Plow, of which the following is a specification:

The object of my invention is to provide a simple and effective machine whereby the plowing of the ground, cutting of weeds to prevent choking of the plows, and the dropping and covering of the seed are all performed at one operation.

The invention consists in the construction and combination of the various parts, as will be hereinafter described and claimed.

In the accompanying drawing, Figure 1 represents a plan view of my improved cornplanter and plow. Fig. 2 is a vertical section of the same, taken mainly on the line $x\ x$ of Fig. 1, and seen from the front. Fig. 3 is a longitudinal section taken on the line $y\ y$ of Fig. 1, and seen in the direction of the arrow. Fig. 4 is a detail view of the gearing of the seed-dropper.

Similar letters of reference indicate corresponding parts.

A are the wheels. B is the tongue. C is the frame, between the two parallel longitudinal bars $c$ of which the plow-beam D is arranged.

The rear end of the plow-beam D is suspended on a block, E, adjustable between two upright bars, $c^1$, attached to the bars $c$, so as to support the plows at the desired elevation, by a pin, $e$, inserted simultaneously through a hole in the block E and through two opposite holes, one in each bar $c^1$, on each side of the block E.

The forward end of the plow-beam D is provided with a cross-head, $d$, having a series of holes, by which and by a pin, $d^1$, it is adjustably attached in one or other of a series of holes made through the hanger $c^2$ at the front of the frame C, for the purpose of adjusting the pitch of the plows.

The rear end of the plow-beam is provided with a downward-projecting arm, $d^2$, behind which is arranged a guide-plate, F, leaving a space between the said plate and arm for forming a channel for guiding the seed when the plows are in working position. The upper end of the guide-plate F is secured by side pieces $f$ to the plow-beam D.

G are the plows, secured, one on each side, to the standard H. This standard is of a U-shaped cross-section, and is pivoted by its sides at $h$ to the rear end of the plow-beam D, in such a manner that when the plows are in working position the inside of the solid front of the standard H will rest against the front of the arm $d^2$ and the open back of the standard H will be closed by the guide-plate F.

I is a rotary cutter, arranged in the opening between the points of the plows G by being pivoted between two lugs at the lower end of a standard, J, the upper end of which latter is pivoted at $j$, and secured by clamps K and bolts $k$ to the plow-beam D.

L is a rod, connecting together the two standards H J by the pivot $l$.

M is a hand-lever, secured to the standard H, for raising and lowering the plows and the cutter out of and into the ground by moving the lever backward and forward, respectively. The lever M is fastened in either of the said two positions by being lodged into one or the other of two notches, $m'$, in the curved stop-bar N, secured on the frame C.

O is the seed-box, mounted on a small frame, C', sufficiently elevated above the frame C to allow of a suitable inclination of the spout $g$, which receives the seed from the dropping-plate P and discharges it into the guide-tube F H in direction of the arrow 1 behind the covering-shovel G'. This shovel G' is secured to the standard H in the opening between the two plows G, a little in the rear of the cutter I, in a suitable position to raise the soil and drop it upon the seed in the rear of the shovel G', as indicated by the arrow 2. The front of the standard of the shovel G' is made sharp or edged, so as to divide and make less resistance to the soil.

The seed-dropping plate P revolves in the bottom of the box O, being secured on an upright shaft, R, in the frame C', which shaft R is provided with a cog-wheel, S, to which motion is transmitted from the wheel A by the cog-wheel $a$, mounted on the hub of the wheel A, and the pinion $b$ and scroll-wheel T, the two latter being mounted on the shaft U.

The scroll-wheel T, gearing into the teeth of the cog-wheel S, revolves the plate P to slide the grains lodged in the holes $p$ on the bottom of the box O under and past the rubber $o$ and the side of the box, and to drop them intermittingly through a hole in the extended bottom plate outside of the box into the spout $g$, when any one of the said holes $p$ passes over the said hole in the bottom plate above the spout $g$.

To prevent cutting of the grains between the upper edge of the holes $p$ and the lower edge of that side of the box O under which the plate P passes in carrying the grains out of the box to be dropped into the spout $g$, a piece of india-rubber, $o$, is used to better advantage than the brush for keeping the grains from crowding in the holes $p$. The crowding would cause some grains to be cut in passing under the side of the box O, and the cutting would destroy the vitality of the grains and prevent their growing.

The shaft U revolves in a hole made eccentrically through a cylindrical hub, V, which is fitted to turn in a bearing, W, on the frame C. The hub V is provided with a hand-lever, $v$, by which it can be turned in the bearing W to throw the pinion $b$ in and out of gear with the cog-wheel $a$ on the hub of the wheel A, to start or stop the seed-dropper P.

Z is the seat of the corn-planter.

The dropping-wheel P is toothed on its circumference, and is kept from moving in the wrong direction by the spring-pawl Q.

I do not limit myself to the exact form or arrangement of any of the parts here shown, as they may be varied without departing from my invention.

Having thus described my invention, I claim as new and desire to secure by Letters Patent—

1. The combination, with the hollow movable standard H, of the fixed plate F, that forms a stop for the standard, and with it a seed-conveyer, as set forth.

2. The plow-beam D, provided with the downward-projecting arm $d^2$ and guide-plate F, in combination with the U-shaped plow-standard H, hinged at $h$ to the plow-beam D, substantially as specified.

3. The combination of the arm J and plow-standard H, both hinged or pivoted to the plow-beam D, and the lever M with the connecting-rod L and the notched stop-bar N on the frame C, substantially as and for the purpose set forth.

DANIEL HAYS.

Witnesses:
J. L. COUGHENOUR,
OSCAR BROOKS.